March 5, 1940.  W. D. MOORE  2,192,451
PORTABLE WATER SOFTENER
Filed April 2, 1937
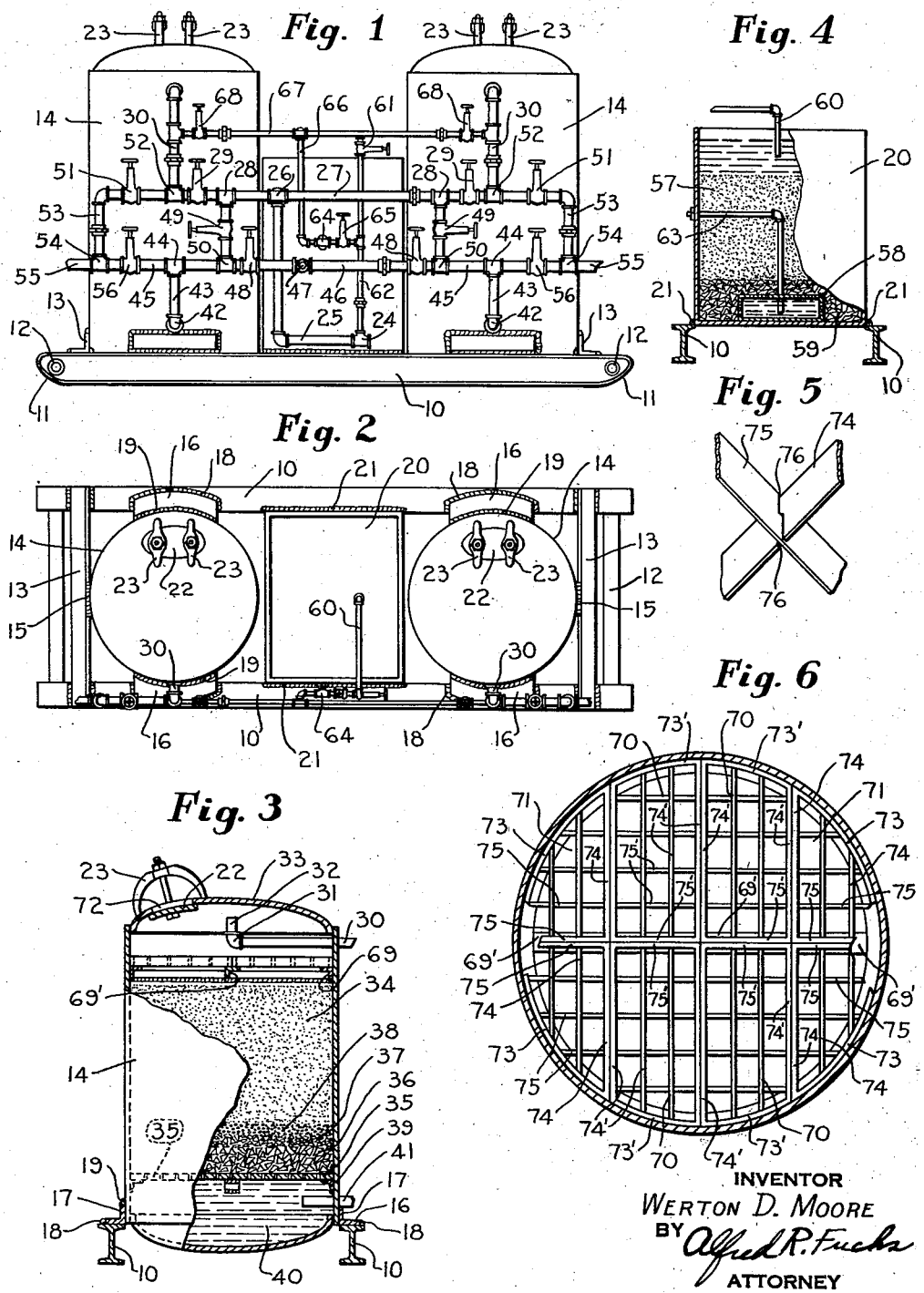
INVENTOR
WERTON D. MOORE
BY Alfred R. Fuchs
ATTORNEY Patented Mar. 5, 1940

2,192,451

UNITED STATES PATENT OFFICE 2,192,451

PORTABLE WATER SOFTENER

Werton D. Moore, Tulsa, Okla., assignor to Royal Manufacturing Company, Tulsa, Okla.

Application April 2, 1937, Serial No. 134,616

2 Claims. (Cl. 210—24)

My invention relates to portable water softeners, and particularly to such water softeners that are adapted for use in oil fields and similar places.

It is a purpose of my invention to provide a water softener of the regenerative type, utilizing zeolite for accomplishing the softening of the water, and a brine tank for the regeneration of the zeolite, which is so constructed and arranged that the same can be readily moved from place to place, can be readily hoisted on a truck for transportation, or pulled along in a field behind a truck, or similar vehicle, and which is strong and sturdy in construction so that it will withstand the rough treatment to which it would be subjected in use in the oil fields, or similar places.

Probably no other thing has caused as much trouble and expense to the oil well driller as boiler difficulties, which are encountered because of untreated, or improperly treated, water. One of the greatest difficulties encountered in the treatment of water for use in boilers in the oil fields, has been that the material, or equipment, used must be portable and must be designed to fit almost any conceivable water condition, and at the same time must be simple in construction and require little time and effort in its operation so that any drilling crew can handle the same easily and with satisfactory results. As a result of the necessity for portable equipment, the usual method of treating water to soften the same has been by means of boiler compounds and apparatus using boiler compounds, or similar water softening agents, that add chemicals to the water to treat it.

One of the principal purposes of this invention is to provide a portable water softener that utilizes the same method of water treatment to soften the same that is used in practically all laundries and fine hotels, and most of the industrial plants, which is the passing of the water through a bed of zeolite or sodium aluminum silicate in the form of a sand, which extracts the chemical compounds from the water that are undesirable, in a well known manner, and the regeneration of the zeolite by means of common salt brine, which portable water softener is so constructed and arranged that it is simple to operate and will at the same time not only remove the chemical compounds from the water that ordinarily form scale, but will also filter the water so as to remove any dirt that might be in the water, therefrom.

To accomplish this purpose I provide a portable water softening apparatus that is mounted on a framework having longitudinal members constituting skids and which comprises a pair of water softening tanks, or treatment tanks, and a brine tank that are so arranged that the tanks cooperate with the frame to strengthen and brace the same, and also are so arranged that the device can be readily handled by means of hoisting apparatus to lift the same on a truck and can be dragged along the ground without any danger of capsizing. In order to make this possible a symmetrical arrangement on the frame is provided, the brine tank being centrally arranged and the two water softening, or treatment tanks, being arranged at equidistantly spaced points from the center of the frame toward opposite ends thereof and from the central brine tank.

It is another important purpose of my invention to provide in water treatment apparatus of the character set forth, a water softening, or water treatment, tank that is so constructed that channeling of the bed of zeolite by the water passing into the same is prevented. This is accomplished by providing a spreading device, or distributing device, in the upper part of the water softening tanks, or treatment tanks. The apparatus utilized is a down flow apparatus and the inlet of the water to be treated, or hard water, is in the top thereof, the discharge of the water being in an upward direction toward and against the top wall of the tank, and my distributing device is arranged between this hard water inlet and the bed of zeolite, or similar softening filter bed, so as to prevent any streams of water from striking said bed in such a manner as to cause channels therethrough, which would reduce the softening effect of the bed of water softening material. The particular means, preferably, used is a grid made up of sections that can be readily inserted through the manhole in the top of the tank, said grid sections being made up of bars intersecting each other and extending at right angles to each other so as to form a reticulated grid structure that acts to break up the water and distribute it over the bed of water softening material so as to prevent any streams of such size to strike the same that there would be channeling caused thereby.

Other objects and advantages of my invention will appear as the description of the drawing proceeds. I desire to have it understood, however, that I do not intend to limit myself to the particular details shown or described except as defined in the claims.

In the drawing:

Fig. 1 is a side elevation of my improved portable water softening apparatus.

Fig. 2 is a top plan view thereof.

Fig. 3 is a broken view partly in section and partly in elevation of one of the water treatment tanks.

Fig. 4 is a similar view of the brine tank.

Fig. 5 is a fragmentary perspective view of one of the grid members, and

Fig. 6 is a horizontal section through a water treatment tank taken just above the grid to show a top plan view of the grid partly broken away.

Referring in detail to the drawing, my improved water softening apparatus comprises a base member having the longitudinally extending frame members 10, which, as will be evident from Fig. 3, are channel shaped in cross section and provide skids that have upwardly beveled end portions 11 thereon. The tubular cross members 12 are provided at opposite ends of the frame, connecting the same, said members 12 being rigidly secured to the longitudinal members 10 in any desired manner, such as by welding, the members 12 extending through the vertical web portions of the members 10, as will be evident from Fig. 1. Any suitable tow means can be attached to the tubular members 12, as will be obvious, in order to drag the portable softening means over the ground behind a truck, or tractor, if this is desired. A pair of transverse angle braces is also provided, welded to the top flanges of the channel members 10.

A pair of water treatment tanks 14 is mounted on the framework thus provided, said tanks being spaced equal distances from the opposite ends of the framework, and being identical in size and construction. The tanks 14 are secured in position on the framework by having the side wall portions thereof welded to the angles 13, as indicated at 15, and are further secured to the longitudinal members 10 by means of the angle members 16, which have curved flanges 17 that are secured to the channel members 10 at 18, and also to the curved side walls of the tanks 14 at 19, said tanks being thus rigidly mounted on the frame in a symmetrical arrangement relative to the frame, the axial centers of the tanks being on the longitudinal center line of the frame.

Between the two tanks 14 and closely adjacent the same with the center thereof located at the exact center of the frame, is a brine tank 20, said brine tank slightly overlapping the longitudinal members, as will be evident from Fig. 4, and being secured to said longitudinal members 10 by means of the welds 21. Thus the tanks 14 and 20 are rigidly supported by the frame and cooperate to brace the frame, becoming integral portions of the frame due to the manner in which the same are mounted and welded thereon. It will also be obvious that the apparatus will be substantially balanced on the frame so that the same can be readily hoisted into position on a truck when it is desired to transport the same from one point to another at a relatively great distance, making it much easier to handle the same with a hoist than would be the case, if such symmetrical balanced arrangement were not provided, and also it will be noted that the piping arrangement and arrangement of manhole closures 22 and clamping means 23 therefor, is such as to further aid in this balanced mounting of the apparatus on the frame, the piping associated with the two tanks 14 being symmetrically oppositely arranged so as to balance the weight lengthwise of the frame, and the manhole closures and clamping means being arranged on the opposite side of the longitudinal center line of the frame to aid in counter-balancing the weight of the piping.

The pipe, or other conduit, supplying the hard water, is connected to the T 24, from which the pipe 25 extends to a T 26, connecting the same with a pipe 27, which, in turn, is provided with the T's 28 and the valves 29, the hard water flowing through the pipe 25 and the pipe 27 through one of the valves 29, one valve being, of course, kept closed while the other valve is open, to the hard water inlet pipe 30, leading to whichever tank 14 is being used for softening the water. The inlet pipe 30 extends through the side wall of the tank 14 and is provided with an upwardly turned elbow 31 having a nipple 32 extending upwardly therefrom so that the water that enters through the pipe 30 will be sprayed upwardly against the dome-like top wall 33 of the tank 14, causing the same to be thrown downwardly toward the bed of zeolite 34.

The filter bed is mounted on a perforated plate 35 in a well known manner, a layer of crushed rock 36 being provided thereon, on which is provided a layer of coarse gravel 37 and upon that layer a layer of finer gravel 38, upon which the sand-like zeolite bed 34 is placed. The perforated plate 35 may be mounted in any desired manner in the tank, as by means of the angle bracket members 39. Below the perforated plate 35 a soft water chamber 40 is provided, and a soft water outlet pipe 41 extends from said soft water chamber 40, there being, of course, a pipe 41 provided on each of the tanks arranged substantially centrally thereof and being provided with elbows 42, from which the vertically extending pipes 43 extend to T's 44, connecting with the pipes 45. The pipes 45 are connected with a soft water outlet pipe 46, which is provided with a T 47 for connecting a feed water line thereto, the connection between the pipes 43 and 46 being made through the valves 48, it being, of course, understood that the valve 48 of that tank 14 is open, which has the valve 29 that is open, associated therewith, while the other valve 48 is closed.

The above setting of valves and arrangement of conduits is used for carrying on the water softening operation until the softening effect of the zeolite bed 34 has decreased to the extent where it is necessary to regenerate the same. When regeneration is necessary, the valve 29 that was open previously, is closed, and the other valve 29 is opened, and also the valve 48 that was open is closed and the other valve 48 opened, thus throwing the other tank 14 into operation so that there will be no interruption in the water softening while regeneration of the zeolite in the tank that has been previously used takes place.

In order to carry out the regeneration, the brine tank 20 is utilized for directing the saturated solution of salt brine into the tank that is to be regenerated. However, where very dirty water is being conditioned, and furthermore to prevent channeling of the zeolite bed, it is usually necessary to first backwash the filter bed. This is accomplished by closing the valve 29 of the tank that is to be backwashed, and opening the valve 49, which is provided in a length of pipe extending between the T 28 and a T 50 provided in the pipe 45. At the same time the valve 51 of said tank is opened, said valve leading from a T 52 that connects the pipe 30 with a pipe 53, which, in turn, is connected by means of a T 54 with a pipe 55 that leads to any suitable dumping place for the mud and sludge washed out of the water softening, or treatment tank. The pipe 55 is an extension of the pipe 45 and is connected therewith through a valve 56, which is kept closed during this backwashing operation, the water, of course, flowing upwardly through the filter bed, and this is continued until the water that passes from the drain pipe 55 is clear, whereupon the valves 51 and 49 are closed.

After the backwashing has been completed and the valves 49 and 51 have been closed, the salt brine is introduced into the tank to regenerate the mineral in the bed 34. The tank 20, preferably, contains about 1000 pounds of undissolved salt as a minimum. This salt is indicated in Fig. 4 by the numeral 57. In the bottom of the tank 20 is a perforated box-like member 58 and around and above said box-like member is a layer of crushed rock 59, the bed of salt 57 being located above the crushed rock bed 59. The brine tank is filled with water through the inlet pipe 60 upon opening of the valve 61, which leads from a pipe 62 that is connected with the T 24. The tank 20 has, of course, been previously filled with water so as to form the brine by means of the salt 57, a brine solution being, of course, on top of the salt bed 57, but this brine solution, which is relatively weak, is drawn through the salt bed when brine is withdrawn through the outlet pipe 63, as the water has to pass from above the salt bed 57 through the crushed rock and through the perforated box-like member 58 into the pipe 63, the inlet end of which extends into the perforated box-like member.

An ejector, or eductor, is utilized to draw the brine from the brine tank, the eductor, or ejector, being generally indicated at 64, and operates in the usual manner by means of the usual Venturi nozzle, provided within the same, upon opening of the valve 65, which is connected with the pipe 62 through a T connection. The passage of the water through the pipe 65 and into the pipe 66 draws the brine in through the ejector device and mixes the saturated salt brine with the water to provide a salt water solution. The pipe 66 is connected with a pipe 67 through a T, and valves 68 are provided leading from the pipe 67 to the pipes 30 through T connections.

In order to accomplish the regeneration of the water softening mineral bed in a tank 14, the valve 68 associated with said tank, is opened, as well as the valve 65, and the valve 56 associated with the same tank is also opened, the other valves being closed. The brine in the brine tank is discharged in this manner until a predetermined level is reached, which is indicated by means of a gauge on said tank. The valves 65 and 68 are then closed and the valve 29 is opened, but only slightly. The valve 29 is left open until the drain water escaping through the pipe 55 is soft, or does not taste salty, whereupon the regeneration is complete, and the excess salt, if any, has been removed. During the passage of the brine through the bed of zeolite, or water softening mineral, the flow of the brine solution is through the pipes 66, 67, valve 68 and pipe 30 into the top of the tank in which the zeolite is being regenerated, through the bed of zeolite mineral 34 and out through the pipe 41, pipe 43 and valve 56 to the drain pipe 55. When the valves 65 and 68 are closed and the valve 29 slightly opened, then the flow is through the pipes 25, 27, valve 29 and pipe 30, through the bed of filtering material in the tank 14 and out through the drain in the same manner as described above. After the regeneration is completed, all the valves associated with the tank 14 that has been regenerated, are closed and the tank is ready for use as soon as the other tank 14 needs regeneration.

It will be obvious that, if the water escaping through the inlet nipple 32 is allowed to pass unrestrictedly to the bed 34 of zeolite, there will be a tendency for channels to form in this filtering material. I avoid this by my improved distributing means comprising a plurality of grid-like members, which are of an elongated character with curved edges so as to collectively form a circular member, as shown in Fig. 6, conforming substantially to the inner diameter of the tank 14. A ring-like member 69, angular in cross section, is provided for supporting the distributor made up of the sections above mentioned, having a transverse angle brace 69' extending diametrically across the same. The sections comprise a plurality of central sections 70 and a plurality of side sections 71, the width of these sections being such that the same can be readily passed through the manhole opening 72, and the length thereof being such that the same can be readily inserted in position in the support comprising the ring 69 and cross member 69'. The side sections each comprise a curved bar 73, forming one side and end thereof, and a plurality of parallel bars 74 that extend lengthwise of said member, one of the same forming one of the side edges thereof. Extending transversely of the side members 71 are the bars 75, one of which forms one of the end edges of each section. Thus the bars 74 and 75 form a grid-like reticulated framework, said bars 74 and 75 being interfitted, as shown in Fig. 5, by providing slots 76 therein that extend half way through said members and being welded together at said interfitted portions to provide a rigid framework.

The central members 70 are made in the same manner as the members 71, having curved bar-like members 73' forming each an end of one of said members, longitudinally extending bar-like members 74', two of which form the opposite side walls of each of said members, and transversely extending bar-like members 75' that connect the bar-like members 74' and are related thereto and connected therewith in the same manner as are the bar-like members 75 with the bar-like members 74, one bar-like member 75' forming an end wall of each member 70. The segmental grid members 70 and 71 are arranged on the supporting member 69 in the manner shown in Figs. 3 and 6, the side members 74 and 74' of adjacent sections 70 and 71 lying in face to face relation to each other in the manner shown in Fig. 6 when the parts are in assembled relation, and the end members 75 of adjacent sections 71 lying adjacent each other, as well as the end members 75' of adjacent sections 70, and the side members 74' of adjacent sections 70. The adjacent ends of sections 70 and 71 are, of course, supported on the transverse supporting angle 69'. It will be obvious that, after the water passing from the inlet connection 32 into the tank 14 drops downwardly after striking the top wall 33, it will engage the reticulated structure made up of the transverse and longitudinal bar members extending at right angles to each other and will be broken up and distributed thereby in such a manner that it will not cause channeling of the zeolite bed 34.

What I claim is:

1. A portable water softening apparatus of the character described comprising a rectangular base comprising a pair of longitudinally extending skids and a pair of transversely extending end members connecting said skids, tanks and means for mounting said tanks on said base comprising a pair of transverse angle members welded to the vertical walls of said tanks and to said skids and a plurality of curved angle members welded to the vertical walls of said tanks and to said skids.

2. In a water softener, a tank having supporting means for a bed of water softening material near the bottom thereof, an upwardly directed hard water inlet in the upper portion of said tank, a grid between said inlet and said bed of water softening material to distribute the water uniformly to said bed, said grid comprising a plurality of elongated, separable sections arranged with their longitudinal edges side by side, said sections being each made up of a plurality of parallel bars intersecting a plurality of parallel bars at right angles to form a reticulated frame, and means for removably mounting said sections in said tank, said tank having an opening therein wider than said sections through which the same may be inserted and removed.

WERTON D. MOORE.